United States Patent Office 3,499,492
Patented Mar. 10, 1970

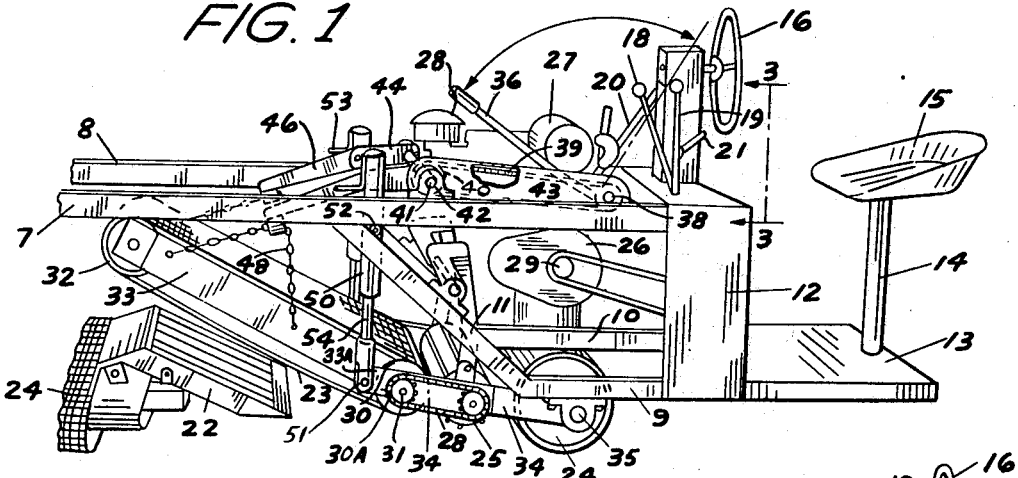
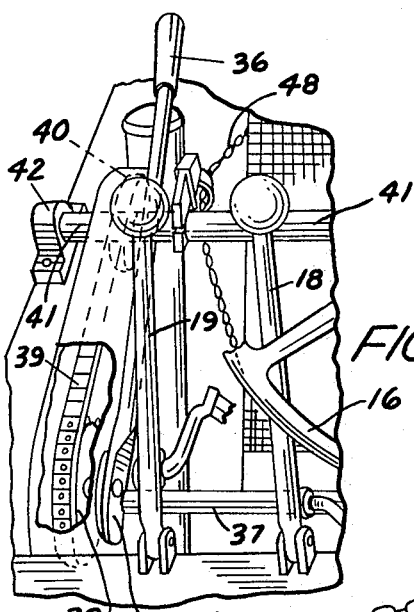
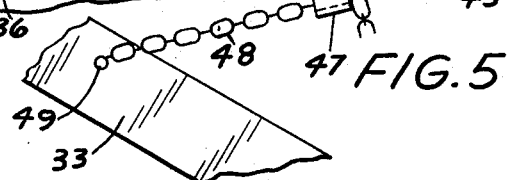

3,499,492
INCLINED CONVEYOR CONTROLS FOR SOD ROLLING MACHINE
Robert C. Daymon, 7450 Weller Road,
Gregory, Mich. 48137
Continuation-in-part of application Ser. No. 577,067, Sept. 2, 1966. This application June 7, 1967, Ser. No. 644,306
Int. Cl. A01b 45/04
U.S. Cl. 172—19                        6 Claims

ABSTRACT OF THE DISCLOSURE

This application discloses remote control means for adjusting the pitch and inclination of the inclined conveyor comprising part of the mechanism of a sod rolling machine. The invention resides in novel combinations of elements for changing the position of either end of the conveyor with respect to the chasis of the machine, certain of which elements are remotely controlled from the operator's seat of the machine.

---

This invention relates to sod rolling machines of the type disclosed in my co-pending application Ser. No. 577,067, filed Sept. 2, 1966, of which this may be considered a continuation in part.

An object of the invention is to provide means for controlling the position of the inclined conveyor of the sod rolling machine, whereby the machine may be adjusted to meet a variety of operating conditions, such as the thickness of the sod, the length of the ribbon of sod to be rolled, the matted condition of the sod and the like.

Another object of the invention is to provide means for adjusting the lower end of the conveyor with respect to the sod roll starting roller.

Another object of the invention is to provide means for adjustably supporting the inclined conveyor in order that the conveyor may be moved out of working position, when it is desired to turn the machine around or transport it from place to place.

Another object of the invention is to provide means for quickly lifting the inclined conveyor out of the sod rolling position in the event that it is desired to pass over a sod roll already formed or being formed.

Another object of the invention is to provide remote control means for quickly elevating the inclined conveyor in the event of a plugged roll.

Another object of the invention is the provision of means for controlling the inclined conveyor which are easily accessible from the top of the sod rolling machine.

Another object of the invention is to provide a sod rolling machine which has an inclined conveyor and control means which are completely visible from the operator's seat, so that he has complete and direct control over them at all times.

Another object of the invention is to provide off center linkage for elevating the front end of the inclined conveyor, which linkage is automatically locked in elevated position and remains locked until manually unlocked.

The foregoing and other objects and advantages of the invention will become more apparent as the description proceeds, reference being made from time to time to the accompanying drawing, forming part of the within disclosure, in which drawing:

FIG. 1 is a fragmentary side elevational view of a sod rolling machine embodying the invention.

FIG. 2 is a fragmentary detail showing the inclined conveyor in elevated position.

FIG. 3 is an enlarged fragmentary detail taken substantially on the line 3—3 of FIG. 1.

FIG. 4 is an enlarged fragmentary detail in elevation, with parts broken away, illustrating the control lever and the off-center linkage in elevated locked condition.

FIG. 5 is an enlarged fragmentary detail showing the lever and elevating linkage in lowered unlocked position.

Referring now more particularly to the drawings, it will be understood that in the embodiment herein disclosed the reference characters 7, 8, 9, 10, 11, and 12, comprise the principal structural parts of the frame of the sod rolling machine, which is provided with a frame extension 13 on which is mounted a seat post 14, and a seat and back rest 15, on which may be seated the operator who is in close operating position to the steering wheel 16, the control levers 18, 19, 20 and 21.

The sod rolling machine also includes an inclined ramp 22, an inclined conveyor 23, a propulsion roller 24, a starting roller 25, and a prime mover 26, which in this instance is a gasoline motor, having a gas tank 27, air cleaner 28, power take off 29, which drives the propulsion roller 24, the starting roller 25, and the inclined conveyor 23, through a power track 27, 28, and certain intermediate elements not shown.

All of the foregoing comprise parts of the sod rolling machine and do not constitute any part of the invention, except as they are combined with the elements hereinafter described.

The invention resides in the provision of means for controlling the inclined conveyor 23.

The inclined conveyor 23 consists of an open mesh belt which is driven by a plurality of sprockets 30, which are mounted for rotation on a shaft 31, which is rotated by means of the sprocket 30A and the chain 28, which comprise part of the power train connected to the engine power take off 29.

The upper end of the inclined conveyor 23 is mounted for rotation about a roller 32, mounted at the upper end of a sub-frame 33, which is pivoted about the shaft 31, which in turn is journalled in the second sub-frame members 34, which are in turn pivoted as at 35 to the frame members 9 and 10.

It is one of the principal purposes of this invention to provide means for raising and lowering the inclined conveyor 23 with respect to the frame of the vehicle and the starting roller 25, so that various attitudes may be effected between the inclined conveyor 23, the inclined ramp 22, and the starting roller 25.

Further, it is important that the front end of the inclined conveyor 23 may be quickly elevated, as shown in FIG. 2, so that the operator may have quick access to the area between the inclined conveyor 23 and the inclined ramp 22, in order to remove any clogged roll of sod or other debris from the area if occasion should demand.

It is further important that the operator be enabled to quickly elevate the inclined conveyor 23 from his riding position when it is necesary to turn the sod rolling machine around, or when it is desired to transport it from place to place.

In order to effect the quick elevation of the front end of the inclined conveyor 23, I provide the following mechanism.

A control lever 36 is pivoted, as at 37, to the frame member 7, and is arranged for forward and backward movement, as shown by the arrows in FIGS. 1 and 4. Secured to the lever 36 and movable therewith around the pivot 37 is a sprocket 38 (FIG. 4). A chain 39 engages the sprocket 38 and a sprocket 40, which is keyed on a shaft 41, which rotates in suitable bearings 42, mounted on the frame members 7 and 8. The sprockets 38 and 40, and the chain 39, are covered by means of a cover 43 in order to keep the parts clean and covered for safety.

Keyed to the shaft 41 is an arm 44, which has pivoted to it, as at 45, another arm 46, the free end of which is provided with a tunnel member 47 through which extends a chain 48, which is secured as at 49 to the subframe 33.

The tunnel member 47 is arranged to engage the various links of the chain 48, so that quick adjustment may be made in its length.

When it is desired to quickly elevate the front end of the inclined conveyor 23, the lever 36 is moved to the position shown in FIGS. 2 and 4. This will rock the arms 44 and 46 around the pivot points 41 and 45, until they assume the position shown in FIG. 4, in which position it will be noted that the arms will be locked in off-center position with respect to the pivot point 41, so that the arms cannot be pulled out of this position by the weight of the inclined conveyor 23 and its frame 33. Only by manually moving the lever 36 from the position shown in FIG. 4, to the position shown in FIG. 5, can the arms be unlocked so that the front end of the inclined conveyor 23 will remain in the elevated position, as shown in FIG. 2, until manually lowered.

In order to effect limited adjustment of the lower end of the inclined conveyor 23, I provide a pair of screw jacks 50, which are pivoted as at 51 to the extensions 33A of the second sub-frame members 34, and are pivotally secured, as at 52, to the frame members 7 and 8.

Upon rotation of the jack cranks 53, the plunger portion 54 is raised and lowered to effect the elevation and lowering of the member 33A, the shaft 31, and the sprockets 30, on which is mounted the endless conveyor 23.

From the foregoing it will be seen that I have devised unique means for adjusting either end of the endless conveyor.

It is believed that the operation of the device is obvious from the foregoing description.

Having described my invention, what I claim and desire to secure by Letters Patent is:

1. In a sod rolling machine, including a frame having a riding operator support, steering means, a propulsion roller, a prime mover, an inclined ramp, and an inclined conveyor mounted for rotation on a sub-frame, the combination of a starting roller rotatably mounted on a second sub-frame which is pivoted to the shaft supporting said propulsion roller, said starting roller being spaced between said propulsion roller and the lower end of said roller being spaced between said propulsion roller and the lower end of said inclined conveyor, said first mentioned sub-frame being pivotally mounted at its lower end to said second sub-frame, and means connected to said frame and said second sub-frame for changing the attitude of said inclined conveyor with respect to said starting roller.

2. The structure of claim 1, in which said first means include a lever pivoted to said frame near said riding operator support, a sprocket pivoted for movement with said lever, a second sprocket pivoted to a shaft journalled on said frame, a chain connecting said sprockets, short arms keyed at one end to said last named shaft, longer arms pivoted to the other end of said short arms, and chains secured to said longer arms and the upper portion of said sub-frame, whereby upon movement of said lever the upper end of said inclined conveyor is moved into varying degrees of inclination.

3. The structure of claim 2, in which said last named chains are adjustably secured to the free ends of said longer arms and the pivot point of said long arms with said short arms is arranged to rock beyond the axis of said shaft whereby to lock said arms against displacement.

4. The structure of claim 2, in which the pivot points of said long arms with said short arms are tangential to the pivot points of said shaft.

5. The structure of claim 1, in which certain of said means raise and lower the lower end of said sub-frame and said inclined conveyor, and other of said means raise and lower the upper end of said sub-frame and said inclined conveyor.

6. The structure of claim 1, in which said last named means include screw jacks pivoted near one end to said frame and pivoted at the other end to extensions of said second sub-frame.

References Cited

UNITED STATES PATENTS

| | | | |
|---|---|---|---|
| 1,294,675 | 2/1919 | Kiner | 198—165 |
| 2,663,242 | 12/1953 | Lancaster | 172—19 |
| 2,682,824 | 7/1954 | Bowser et al. | 172—19 |
| 2,778,292 | 1/1957 | Kavan | 172—20 |
| 3,053,328 | 9/1962 | Geipel | 172—19 |
| 3,164,211 | 1/1965 | Scott | 172—19 |
| 3,235,011 | 2/1966 | Pasinski et al. | 172—19 |

ROBERT E. PULFREY, Primary Examiner

A. E. KOPECKI, Assistant Examiner